United States Patent
Cionca et al.

(10) Patent No.: US 11,029,409 B2
(45) Date of Patent: Jun. 8, 2021

(54) SENSOR FIELD OF VIEW MAPPING

(71) Applicant: Ford Global Technologies, LLC, Dearborn, MI (US)

(72) Inventors: Codrin Cionca, Ann Arbor, MI (US); Mostafa Parchami, Dearborn, MI (US); Zhen Zhao, Farmington Hills, MI (US); Juan Enrique Castorena Martinez, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/985,296

(22) Filed: Aug. 5, 2020

(65) Prior Publication Data

US 2020/0363533 A1 Nov. 19, 2020

Related U.S. Application Data

(63) Continuation of application No. 16/135,288, filed on Sep. 19, 2018, now Pat. No. 10,775,509.

(51) Int. Cl.
| | |
|---|---|
| *G01S 17/89* | (2020.01) |
| *B64C 39/02* | (2006.01) |
| *G01S 17/08* | (2006.01) |
| *G08G 1/01* | (2006.01) |
| *G01S 17/931* | (2020.01) |
| *G01S 17/42* | (2006.01) |

(52) U.S. Cl.
CPC ............ *G01S 17/89* (2013.01); *B64C 39/024* (2013.01); *G01S 17/08* (2013.01); *G01S 17/931* (2020.01); *G08G 1/0116* (2013.01); *G01S 17/42* (2013.01)

(58) Field of Classification Search
CPC ........ G01S 17/89; G01S 17/931; G01S 17/08; G01S 17/42; G01S 17/86; G01S 17/87; G01S 15/86; G01S 15/87; G01S 15/89; G01S 15/93; G01S 2013/93275; G01S 13/93; G01S 17/93; G01S 13/86; G01S 13/931; G01S 13/08; G01S 15/08; G01S 15/931; G01S 11/12; B64C 39/024; B64C 2201/12; G08G 1/0116; G08G 1/166; H04W 4/40; H04W 4/44; H04W 4/46; H04W 4/38; G08C 17/02; H04L 67/12; H04B 7/18506
USPC ........................................................ 703/117
See application file for complete search history.

(56) References Cited

U.S. PATENT DOCUMENTS

| | | | |
|---|---|---|---|
| 9,944,392 B2 | 4/2018 | Abuelsaad et al. | |
| 9,977,431 B2 | 5/2018 | Lockwood et al. | |
| 10,424,204 B1 * | 9/2019 | Han | G05D 1/02 |

(Continued)

FOREIGN PATENT DOCUMENTS

CN  107507444 A  12/2017

OTHER PUBLICATIONS

Fawaz, et. al., "Unmanned Aerial Vehicles as Store-Carry-Forward Nodes for Vehicular Networks", IEEE Access, vol. 5, published Oct. 23, 2017, pp. -23710-23718 (9 pages).

(Continued)

*Primary Examiner* — Muhammad Shafi
(74) *Attorney, Agent, or Firm* — Frank A. MacKenzie; Bejin Bieneman PLC (57) ABSTRACT

A map of an area is generated from first sensor data of a first field of view including a blocked area and second sensor data of a second field of view having an unblocked view of the blocked area.

16 Claims, 6 Drawing Sheets

(56) References Cited

U.S. PATENT DOCUMENTS

| | | | |
|---|---|---|---|
| 2010/0253539 A1* | 10/2010 | Seder | G01S 13/87 |
| | | | 340/903 |
| 2015/0187216 A1 | 7/2015 | Kwak | |
| 2016/0097849 A1* | 4/2016 | Nichols | G08G 1/096783 |
| | | | 342/107 |
| 2017/0249838 A1* | 8/2017 | Breed | G07C 5/085 |
| 2017/0292848 A1* | 10/2017 | Nepomuceno | G01C 21/3492 |
| 2018/0074499 A1 | 3/2018 | Cantrell et al. | |
| 2018/0188026 A1* | 7/2018 | Zhang | G01C 11/06 |
| 2018/0225970 A1* | 8/2018 | Mitra | G08G 1/0141 |
| 2018/0357493 A1* | 12/2018 | Takamatsu | B60R 21/00 |
| 2019/0212153 A1* | 7/2019 | Adireddy | G08G 1/0112 |

OTHER PUBLICATIONS

Dronets ITS, "Drone-Aided Platform for Enabling Next Generation Intelligent Transport Systems—Advanced Wireless and Security Lab", retrieved on Jun. 19, 2018 from Internet URL: https://adwise.fiu.edu/research-2/droneits-drone-aided-platform-for-enabling-next-generation-intelligent-transport-systems (3 pages).

* cited by examiner

SENSOR FIELD OF VIEW MAPPING

CROSS-REFERENCE TO RELATED APPLICATION

This patent application is a continuation of, and as such claims priority to, U.S. patent application Ser. No. 16/135,288, filed on Sep. 19, 2018, now U.S. Pat. No. 10,775,509, which is hereby incorporated herein by reference in its entirety.

BACKGROUND

Vehicles often rely on sensor data for operation. For example, sensors such as cameras, radar, lidar, ultrasound, etc., can provide data for identifying objects, e.g., road signs, other vehicles, pedestrians, etc., and road conditions, e.g., ice, snow, cracks, potholes, bumps, etc. Sensors provide data within a sensor field of view.

DETAILED DESCRIPTION

System Overview

An area map (sometimes referred to herein simply as a "map") i.e., a representation of a local spatial environment, e.g., an area or volume proximate to a vehicle can be generated from sensor data. Sensors provide data about a field of view, i.e., an area or volume, from physical phenomena (e.g., heat, light, air, sound, etc.) that can reach the sensor from within the field of view. For example, a camera sensor provides image data from a field of view, e.g., an image of the field of view, from light that reaches the camera lens and optical sensors from within the field of view. A LIDAR (LIght Ranging And Detection) sensor similarly provides data by interpreting light detected within a field of view; a radar detects electromagnetic; a radar detects electromagnetic waves within a field of view; an ultrasound sensor detects acoustic waves in a field of view. A sensor's field of view can be occluded by an object that prevents phenomena to be sensed from reaching the sensor. To address the situation where a sensor's field of view is partly occluded by an object while the sensor is receiving physical phenomena for at least a portion of the field of view, it is possible to deploy one or more second sensors to receive physical phenomena occluded from the first sensor, i.e., to provide data about an occluded portion of the first sensor's field of view.

A method, comprises generating a map of an area from first sensor data of a first field of view including a blocked area and second sensor data of a second field of view having an unblocked view of the blocked area. The first sensor data and the second sensor data can be from a same sensor. The method can further comprise moving the sensor from a first position providing the first field of view to a second position providing the second field of view. The first sensor data and the second sensor data can be respectively from a first sensor and second sensor. The method first sensor can be mounted to a stationary infrastructure node and the second sensor can be included on a vehicle. The first sensor can be mounted to a stationary infrastructure node and the second sensor can be mounted to one of a movable platform attached to the infrastructure node or an unmanned aerial vehicle. Identifying the blocked area can include determining a position and a size of an object. The method can further comprise determining the second field of view based on at least one of a position of a second sensor, a position of an obstacle, and a size of the obstacle. The method can further comprise generating the map based on third sensor data for a field of view of a second blocked area. The method can further comprise defining the blocked area based on lines of sight emanating from the first sensor.

A system comprises a computer including a processor and a memory, the memory storing instructions executable by the processor to generate a map of an area from first sensor data of a first field of view including a blocked area and second sensor data of a second field of view having an unblocked view of the blocked area. The first sensor data and the second sensor data can be from a same sensor. The instructions can further comprise to move the sensor from a first position providing the first field of view to a second position providing the second field of view. The first sensor data and the second sensor data can be respectively from a first sensor and second sensor. The first sensor can be mounted to a stationary infrastructure node and the second sensor can be included on a vehicle. The first sensor can be mounted to a stationary infrastructure node and the second sensor can be mounted to one of a movable platform attached to the infrastructure node or an unmanned aerial vehicle. Identifying the blocked area can includes determining a position and a size of an object. The instructions can further comprise to determine the second field of view based on at least one of a position of a second sensor, a position of an obstacle, and a size of the obstacle. The instructions can further comprise to generate the map based on third sensor data for a field of view of a second blocked area. The instructions can further comprise to define the blocked area based on lines of sight emanating from the first sensor.

System Overview

Figure 1:
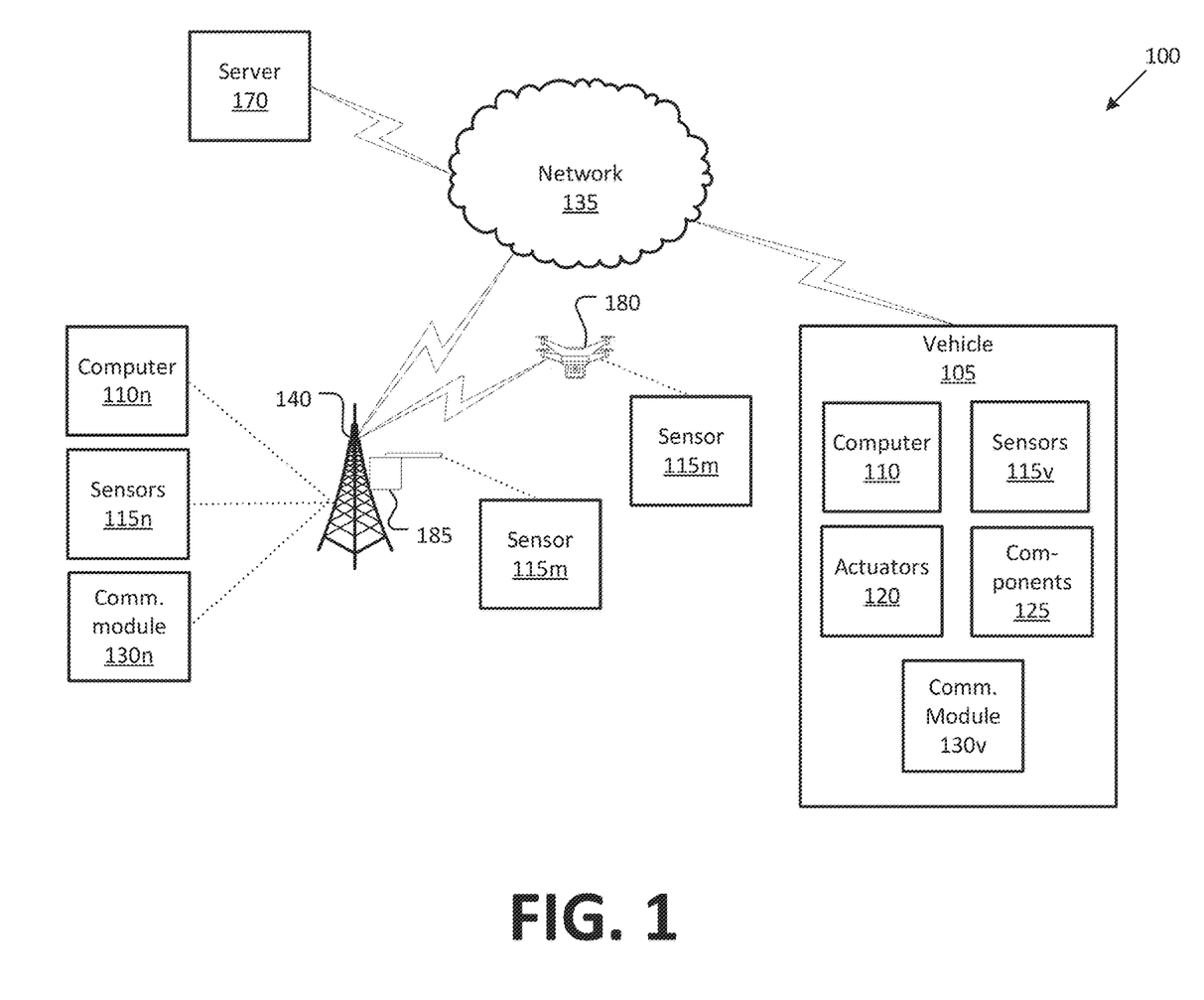
FIG. 1 is a diagram illustrating an example sensing system.

An area mapping system 100 includes an infrastructure node 140 that is typically provided to assist operation, e.g., provide navigation and/or path planning support, to one or more vehicles 105. The node 140 can have mounted or fixed thereto one or more sensors 170. The node 140 further includes a communications module 175 to provide vehicle-to-infrastructure (V2X) communications and/or communications via a wide area network 135. The node 140 also includes a node computer 110$n$ that can receive and process data from one or more sensors 115$n$, and initiate communications via the communications module 130$n$. The computer 110$n$ may be programmed to generate an area map based on data from the sensors 170. The map can then be provided to one or more vehicles 105. Further, upon determining that a field of view of a sensor 115$n$ is occluded, the computer 110$n$ may be programmed to deploy a movable sensor 115$m$ to observe an occluded portion of the field of view of the sensor 115$n$.

For example, the node 140 could store and/or the computer 110n could be programmed to access and command an unmanned aerial vehicle (UAV) 180 that could carry the sensor 115m. Moreover, a movable sensor 115m could be deployed in a variety of other ways, e.g., by a moving arm 185 mounted to the infrastructure node 140. Further, a vehicle 105 can provide data from one or more vehicle sensors 115v. The computer 110n can further be programmed to combine data from sensors 115n, 115m, 115v to provide a map of an area that is partly occluded in a field of view of the sensor 115n.

Note that when reference is made herein to "sensors 115," such reference collectively refers to sensors 115m, 115n, and 115v, i.e., "sensors 115," unless explicitly indicated otherwise, means one or more sensors 115m, 115n, and/or 115v, and a "sensor 115" could be any of a sensor 115m, a sensor 115n, and a sensor 115v. Likewise, sensors 115-1 and 115-2 refer to different instances of sensors 115 that could be any of sensors 115m, 115n, or 115v. Similar notes should be made with respect to references to computers 110, communications modules 130, blocked regions 205, objects 210, etc.

A vehicle 105 is typically a land vehicle such as a car, truck, bicycle, motorcycle, etc. The vehicle 105 includes a vehicle computer 110v, sensors 115v, actuators 120 to actuate various vehicle components 125, and a vehicle communications module 130v. Via a network 135, the communications module 130v allows the vehicle computer 110v to communicate with one or more data collection or infrastructure nodes 140 and a central server 170.

The computer 110v includes a processor and a memory such as are known. The memory includes one or more forms of computer-readable media, and stores instructions executable by the computer 110v for performing various operations, including as disclosed herein.

The computer 110v may operate a vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the computer 110; in a semi-autonomous mode the computer 110v controls one or two of vehicles 105 propulsion, braking, and steering; in a non-autonomous mode a human operator controls each of vehicle 105 propulsion, braking, and steering.

The computer 110v may include programming to operate one or more of vehicle 105 components 125, e.g., brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110v, as opposed to a human operator, is to control such operations. Additionally, the computer 110v may be programmed to determine whether and when a human operator is to control such operations.

The computer 110v may include or be communicatively coupled to, e.g., via a vehicle 105 communications bus or other vehicle 105 wired or wireless network, more than one processor, e.g., included in electronic controller units (ECUs) or the like included in the vehicle for monitoring and/or controlling various vehicle components 125, e.g., a powertrain controller, a brake controller, a steering controller, etc. The computer 110v is generally arranged for communications on a vehicle communication network that can include a communications bus in the vehicle such as a controller area network (CAN) or the like, and/or other wired and/or wireless mechanisms.

Via the vehicle 105 network, the computer 110v may transmit messages to various devices in the vehicle and/or receive messages from the various devices, e.g., sensors 115, an actuator 120, an human machine interface (HMI), etc. Alternatively or additionally, in cases where the computer 110v actually comprises a plurality of devices, the vehicle 105 communication network may be used for communications between devices represented as the computer 110v in this disclosure. Further, as mentioned below, various controllers and/or sensors 115 may provide data to the computer 110v via the vehicle communication network.

Vehicle 105 sensors 115 may include a variety of devices such as are known to provide data to the computer 110v. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105, an ultrasonic sensor 115, etc.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components, and any program instructions stored therein and/or executable thereby, that are adapted to perform a mechanical or electromechanical function or operation—such as moving the vehicle 105, slowing or stopping the vehicle 101, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, etc.

In addition, the computer 110v may be programmed and otherwise configured (e.g., with appropriate hardware interface(s)) for communicating via a vehicle-to-vehicle communication module or interface 130v with devices outside of the vehicle 105, e.g., through wireless vehicular communication (e.g., vehicle-to-vehicle (V2V) communication, vehicle-to-infrastructure (V2I or V2X) communication, vehicle-to-cloud (V2C) communication, etc.), to an infrastructure node 140 (typically via direct radio frequency communications) and/or (typically via the network 135) a remote (i.e., external to the vehicle 105 and in a geographic location out of a line of sight of the vehicle 105 and node 140) server 170. The module 130v could include one or more mechanisms by which the computers 110v of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130v include cellular, Bluetooth, IEEE 802.11, dedicated short range communications (DSRC), and/or wide area networks (WAN), including the Internet, providing data communication services.

The network 135 can include one or more mechanisms by which a vehicle computer 110v may communicate with an infrastructure node 140 and/or central server 170. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

An infrastructure node 140 includes a physical structure such as a tower or other support structure (e.g., a pole, a box mountable to a bridge support, cell phone tower, road sign support, etc.) on which infrastructure sensors 115n, as well as an infrastructure communications module 130n and computer 110n can be mounted, stored, and/or contained, and powered, etc. One infrastructure node 140 is shown in FIG. 1 for ease of illustration, but the system 100 could and likely would include tens, hundreds, or thousands of nodes 140. The infrastructure node 140 is typically stationary, i.e., fixed to and not able to move from a specific geographic location. The infrastructure sensors 115n may include one or more sensors such as described above for the vehicle 105 sensors 115, e.g., LIDAR, radar, cameras, ultrasonic sensors, etc. The communications module 156 and computer 110n typically have features in common with the vehicle computer 110v and vehicle communications module 130v, and therefore will not be described further to avoid redundancy. Although not shown for ease of illustration, the infrastructure node 140 also includes a power source such as a battery, solar power cells, and/or a connection to a power grid.

A computer 110 can receive data from sensors 115 to generate an area map. For example, a node 140 can be situated for sensors 115n to provide data about an area around the node 140. Further for example, a vehicle 105 during operation (whether non-autonomous, semi-autonomous, or autonomous) can use sensors 115v to monitor objects in an area around the vehicle 105. In the context of this disclosure, an "object" is a physical, i.e., material, item that is detectable by a sensor 115. An object can be stationary or mobile. Data about one or more objects can be used to create an area map, i.e., a representation of a local spatial environment. In examples discussed herein, an area map is a top-down view of a local spatial environment that includes regions and objects relevant to vehicle 105 navigation such as roads, traffic elements such as signs as lights, and detected objects. Information to construct an area map can come from map information stored by computers 110v, 110n, and can be combined with information from sensors 115, including video sensors, lidar sensor 115, etc. A vehicle 105 computer 110v can use such data to construct the map and correctly position a vehicle 105 and various objects in it.

The server 170 can be a conventional computing device, i.e., including one or more processors and one or more memories, programmed to provide operations such as disclosed herein. Further, the server 170 can be accessed via the network 135, e.g., the Internet or some other wide area network.

Sensor Fields of View

Figure 2:
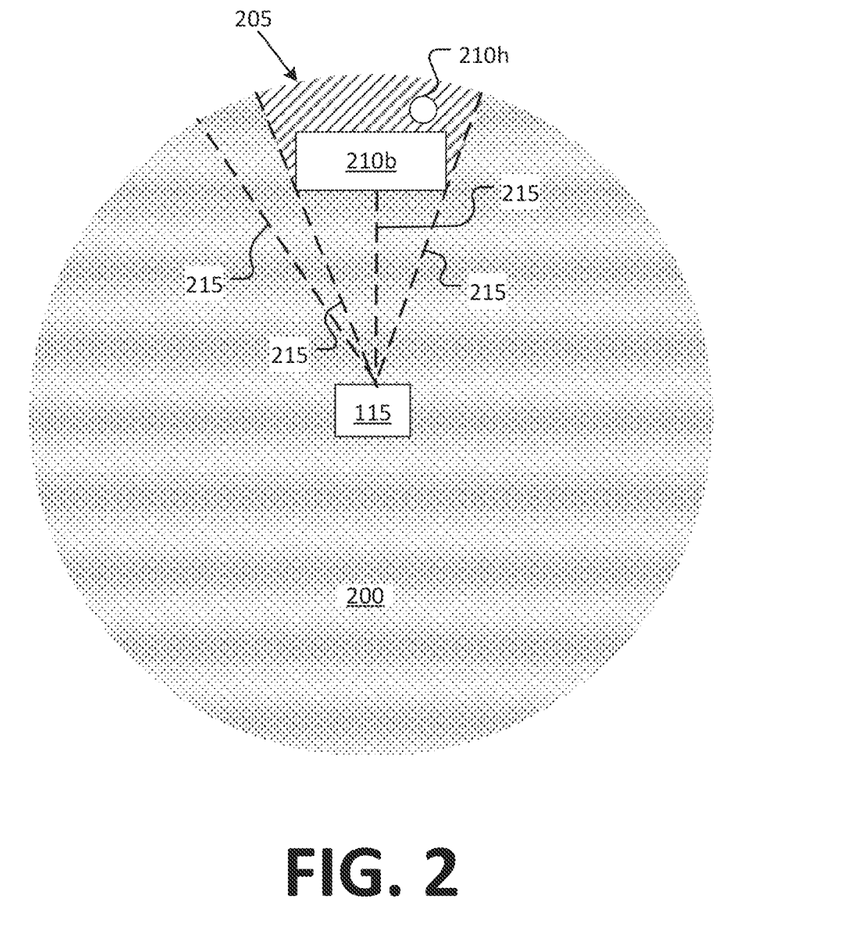
FIG. 2 illustrates an example sensor field of view.

FIG. 2 illustrates an example sensor 115 field of view 200. Sensors 115, as discussed above, are generally provided to detect objects 210. For example, an object 210 could be any object that might be situated in a traffic scene such as a road, parking lot, intersection, etc., and that might be detected within and/or occlude some or all of a sensor 115 field of view 200.

In the examples illustrated herein, it is assumed that sensors 115 have 360 degree fields of view, e.g., as may be the case with a lidar sensor 115. However, it should be understood that a sensor 115 could have a more limited field of view, e.g., a camera sensor 115 could be limited to a field of view of less than 180 degrees, a radar or lidar sensor 115 could be mounted or arranged so as to have a field of view of less than 360 degrees, an ultrasound sensor could have a more limited field of view, etc.

Figure 3:
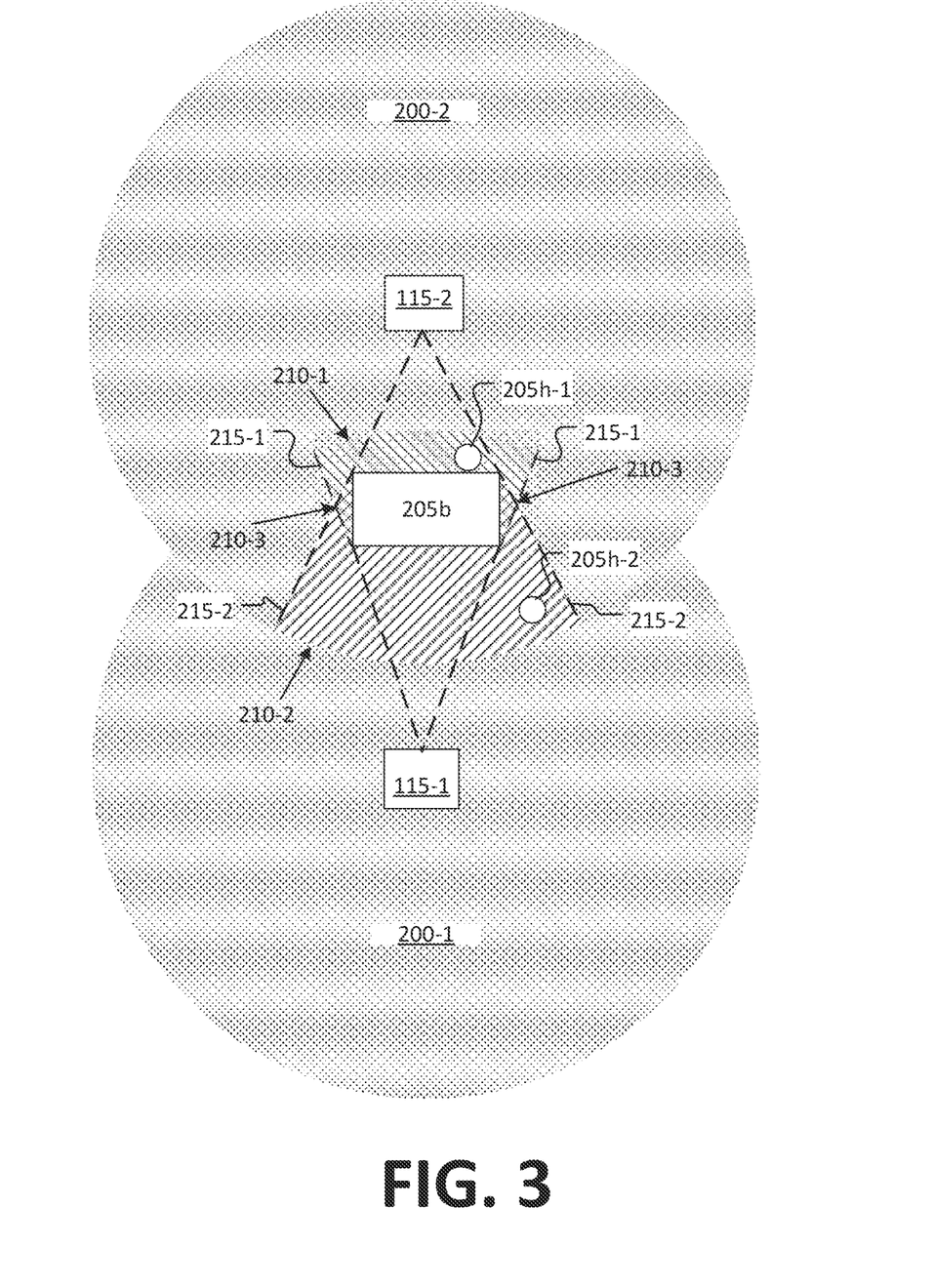
FIG. 3 illustrates an example of respective fields of view of two sensors and a single occluding object.
Figure 4:
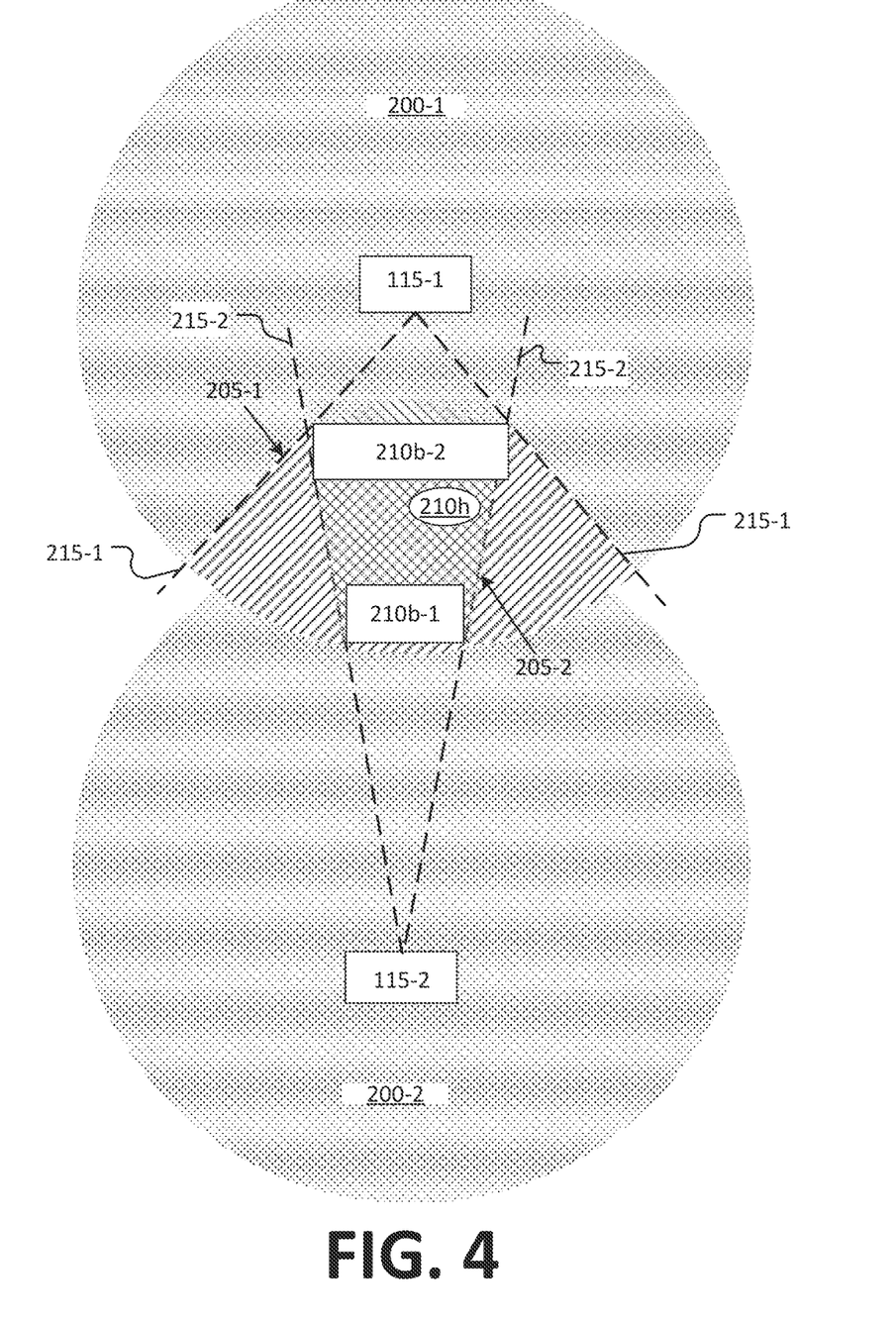
FIG. 4 illustrates an example of respective fields of view of two sensors and two occluding objects.

The field of view 200 shown in FIG. 2 includes an occluded or blocked region 205, i.e., the region shown by shading in FIG. 2 (other region or regions in FIG. 2 being unblocked, i.e., within a field of view of the sensor 115). Although the terms region or area may sometimes be thought to refer to two dimensions, a blocked region 205 can be three-dimensional, i.e., a volume. FIGS. 2-4, illustrating various blocked regions 205, are shown in two dimensions, i.e., in a top-down view, for ease of illustration. However, it will be understood that, in practice, a blocked region 205 likely will be a three-dimensional volume or space.

Lines of sight 215 are shown in the so-labeled dashed lines. A line of sight (or sight line) in the present context means a line extending from a detection surface of a sensor 115 into space. The lines of sight shown in FIG. 2 determine boundaries of the blocked region 205. That is, any point in an area or space from which a line of sight from a sensor 115 is blocked or occluded is a point in a blocked region 205. A point or area is unblocked with respect to a sensor 115 if within the sensor 115 field of view.

Accordingly, lines of sight 215 can determine boundaries of a blocked region 205, i.e., as determined by a sensor 115 location and orientation, as well as by boundaries or contours of a blocking object 210b. The blocked region 205 is a region or area of the sensor 115 field of view for which the sensor 115 is blocked or prevented from detecting physical phenomena by which the sensor 115 can provide data to detect objects 210. For example, in FIG. 2, a blocking object 210b is within the field of view 200 of the sensor 115. Therefore, the sensor 115-1 cannot detect an object 210h-1 (i.e., a hidden object 210 with respect to the sensor 115-1) in the blocked region 205-1, but the sensor 115-2 can.

FIG. 3 illustrates an example of respective fields of view 200-1, 200-2 of two sensors 115-1, 115-2 and a single occluding object 205b. Respective sight lines 215-1, 215-2 from the sensors 115-1, 115-2 define boundaries of blocked regions 210-1, 210-2. A hidden object 205h-1 is visible or detectable to the sensor 115-2 within the field of view 200-2, but is blocked or occluded from detection within the field of view 200-1 of the sensor 115-1. Further, note blocked regions 210-3 were the blocked regions 210-1 and 210-2 overlap. That is, the blocked regions 200-3 are areas or zones where each of the sensors 115-1, 115-2 is blocked from detection.

FIG. 4 illustrates an example of respective fields of view 200-1, 200-2 of two sensors 115-1, 115-2 and a two occluding objects 210b-1, 210b-2. As can be seen, the objects 210b-1, 210b-2 are located with respect to the sensors 115-1, 115-2 such that a hidden object 210h is within respective blocked zones 205-1, 205-2 of the sensors 115-1, 115-2.

Figure 5:
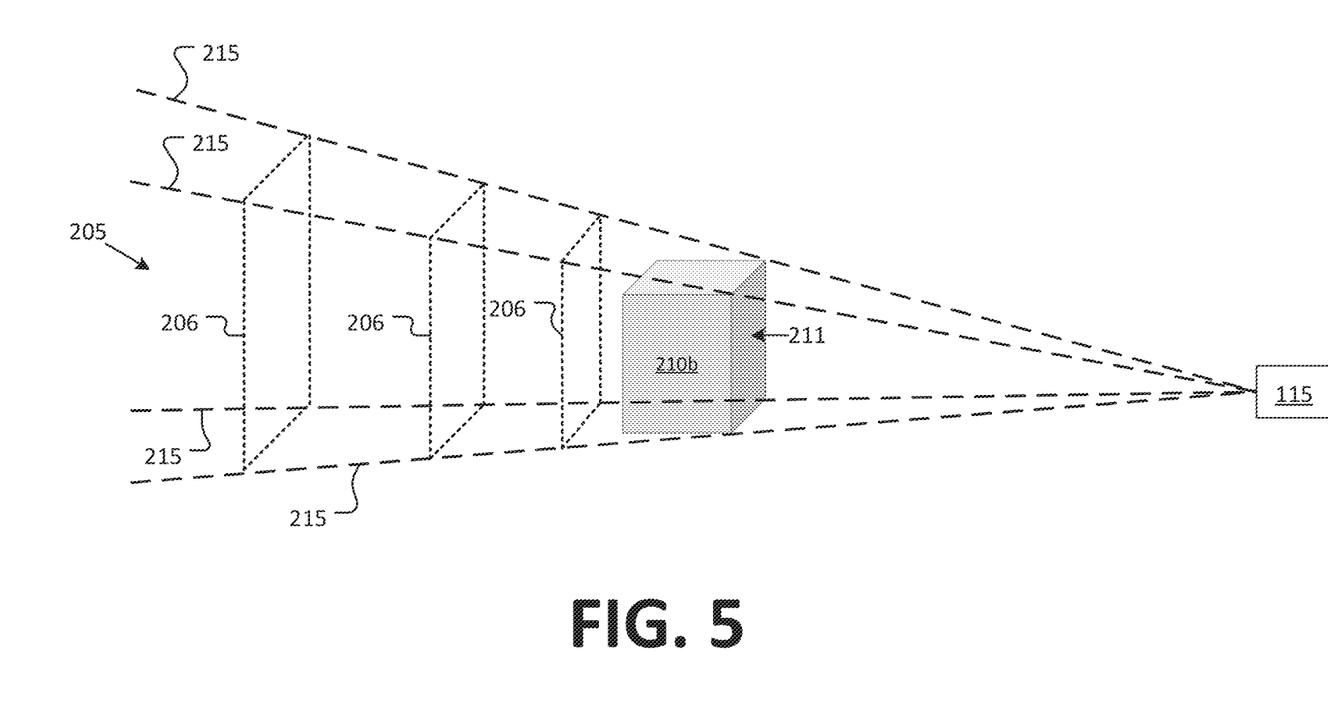
FIG. 5 illustrates an example of determining a blocked area based on sensor lines of sight.

FIGS. 2-4 provide two-dimensional top-down views for ease of illustration. FIG. 5 illustrates an example of determining a blocked area based on sensor lines of sight, including a representation of an object 210b and a blocked area 205 in three dimensions. As illustrated in FIG. 5, a sensor 115 can detect a blocking object 210b. In this example, for ease of illustration the object 210b is a rectangular solid, having a rectangular surface 211 facing the sensor 115; the object 210b could have a more complex shape and/or surface facing the sensor 115. Lines of sight 215 are shown emanating from the sensor 115 and passing through corners of the surface 211 facing the sensor 115. The illustrated lines of sight 215 define the blocked region 205. Cross sections 206 are shown to better illustrate the blocked region 205. A computer 110 can be programmed to project lines of sight through corners or edges of an object 210b, and to thereby determine a blocked region 205 by identifying an area or space defined by the lines of sight and a surface of the object 210b (e.g., the surface 211 in the example of FIG. 5) closest to the sensor 115.

Processing

Figure 6:
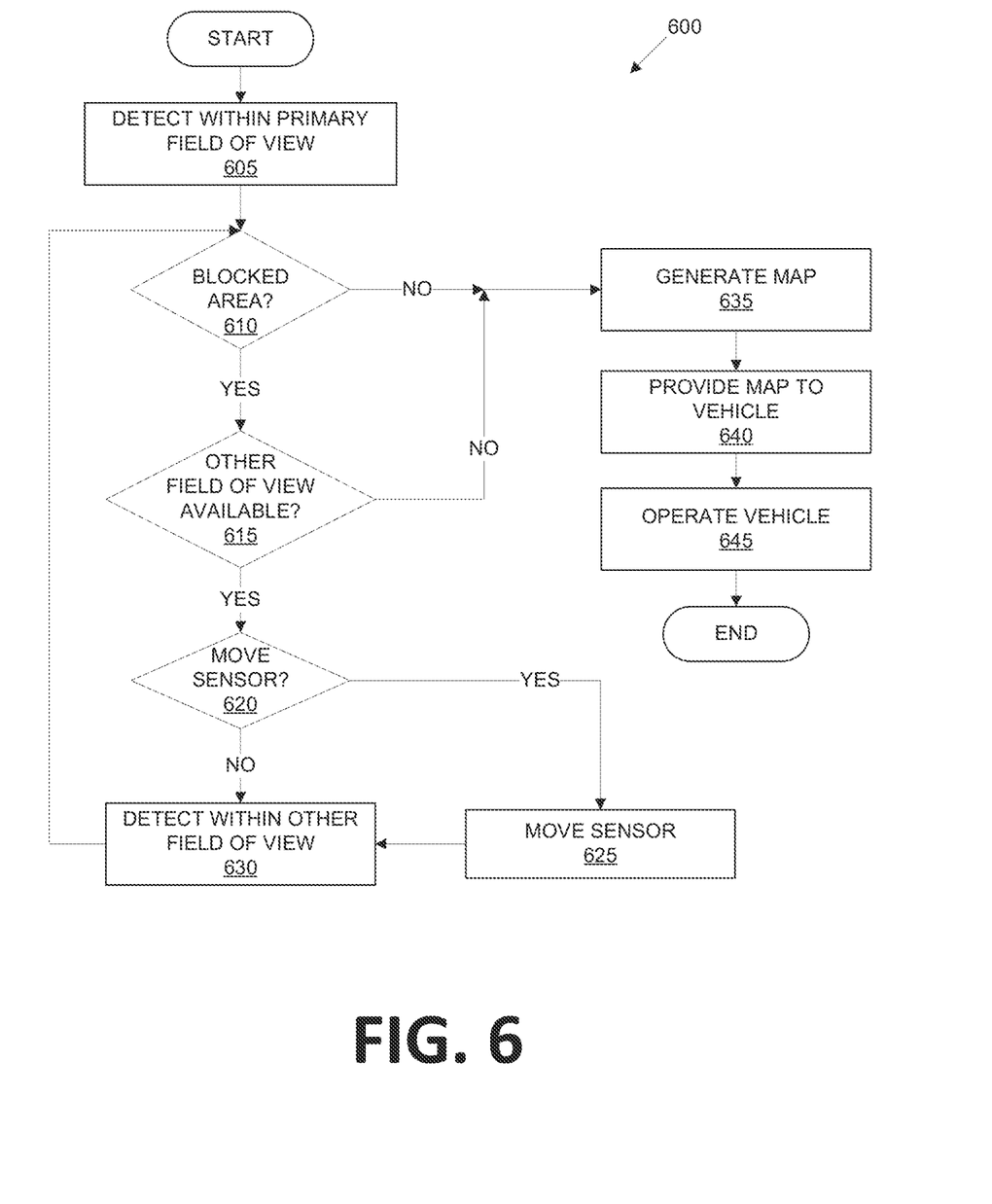
FIG. 6 illustrates an exemplary process for combining data from sensors having different fields of view.

FIG. 6 illustrates an exemplary process 600 for combining data from sensors 115 having different fields of view. The process 600 begins in a block 605, in which a computer 110 receives and analyzes data from one or more sensors 115. In one example, the block 605 is executed in a computer 110n included in on infrastructure node 140 based on data from one or more sensors 115n also included on the infrastructure node 140. Alternatively, the block 605 could be executed in a computer 110v on a vehicle 105 according to data from vehicle sensors 115v. Data from sensors 115 is provided based on detected physical phenomena, e.g., lidar and camera sensors 115 detect light. Detected physical phenomena can be used to provide sensor 115 data, e.g., a two-dimensional or three-dimensional image. The computer 110 can analyze sensor 115 data using various object recognition techniques to detect objects 210, typically including a size, shape, and location of each detected object 205. For example, a size may be specified according to a length and a width, a radius, a circumference, etc., e.g., as might be determined from image analysis techniques. A location, e.g., a set of coordinates according to a coordinate system specified with reference to the sensor 115, e.g., a Cartesian or polar coordinates system, may likewise be determined. Techniques for classifying objects in image data, lidar data, etc. may be used, wherein, as is conventionally done, an object 210 size can be determined based on an object 210 classification.

Following the block 605, in a decision block 610, the computer 110 determines whether it has detected a blocking object 210b. Put another way, the computer 110 determines, based on a detected size, shape, and/or location of a detected object 210, e.g., according to various object classification techniques, whether a sensor 115 field of view includes a blocked area or region 205. For example, the computer 110 could be programmed 115 could If the determination of the block 605 is yes, then the process 600 proceeds to a block 615. If no, the process 600 proceeds to a block 635.

In the block 615, the computer 110 determines whether another field of view is available whereby the blocked region 205 identified in the block 610 can be sensed. Typically this means that the computer 110 determines whether a sensor 115 with another field of view is available to provide data to the computer 110.

In an example where the computer 110 is a node computer 110n, the block 615 can include determining whether a second node 140 including one or more second sensors 115 is available to view the blocked region 205 identified in the block 610, i.e., has a complete or partial unblocked view of the region 205. Alternatively or additionally, a node computer 110n could deploy a UAV 180 and/or a platform arm 185 carrying a sensor 115m to view the blocked region 205. For example, the UAV 180 could include processing and control mechanisms such that the UAV 180 could be instructed to hover over or otherwise gain a vantage point, i.e., complete or partial unblocked field of view, from which the blocked region 205 can be sensed by a sensor 115m included on the UAV 180. Alternatively or additionally, a computer 110n could provide instructions to actuate the arm 185 to move to a position to sense physical phenomena from the blocked region 205. Yet further alternatively or additionally, a computer 110n could determine if one or more vehicles 105 are located or positioned so as to be able to provide sensor 115v data from sensed physical phenomena in the blocked region 205.

In another example, the computer 110 could be a vehicle computer 110v included in a vehicle 105. The computer 110v could have determined in the block 610 that one or more objects 210b block a field of view of vehicle 105 sensors 115v. The computer 110v could then execute programming to identify one or more infrastructure nodes 140 and/or other vehicles 105 positioned or located to provide sensor 115 data from the blocked field of view region 205.

The computer 110 could determine whether another field of view is available in a variety of ways. For example, a node computer 110n could store in a memory data specifying one or more other nodes 140 and locations and/or orientations of sensors 115n on the other nodes. Alternatively or additionally, the node computer 110n could store in a memory data specifying one or more movable sensors 115m available to it, e.g., data specifying a UAV 180 and/or arm 185 mounted or stored at the node 140. Yet further, the computer 110 could detect one or more vehicles 105 to provide sensor 115v data of a field of view, e.g., the computer 110 could determine a location and projected path of a vehicle 105 to determine whether vehicle 105 sensors 115v can provide data of a blocked region 205.

In any case, if another field of view is not available, then the process 600 proceeds to the block 635. Otherwise, the process 600 proceeds to a block 620. Note that, in some cases, it may not be possible to resolve, i.e., provide data about physical phenomena and, a blocked region 210. For example, if the only sensors available in the example of FIG. 3 are the illustrated sensors 115-1 and 115-2, then it may not be possible to obtain data from the blocked regions 210-3 shown in FIG. 3. On the other hand, if additional sensors 115 are available, e.g., a vehicle 105 or infrastructure node 140, or perhaps a mobile sensor 115m could be deployed, then it may be possible to obtain data from one or both of the illustrated blocked regions 210-3.

In the block 620, the computer 110 determines whether and identified sensor 115 to view a blocked region 210 is a mobile sensor 115m. If yes, the process 600 proceeds to a block 625. If no, the process 600 proceeds to a block 630.

In the block 625, the computer 110 provides commands to a mobile sensor 115m platform, e.g., a UAV 180 or an arm 185, to move the sensor 115m to sense physical phenomena in the blocked region 210.

In the block 630, which can follow either of the blocks 620, 625, the computer 110 receives and analyzes data received from a sensor 115 identified as described above regarding the block 615. The process 600 then returns to the block 610 to determine whether any further blocked areas or regions 210 are present.

In the block 635, which can follow either of the blocks 610, 615, the computer 110 analyzes data received from sensors 115 to generate an area map. For example, if the block 610 was visited once, i.e., no blocked area 205 was identified, then the computer 110 may generate the area map from data from a single sensor 115, or a set of sensors 115 all associated with a same infrastructure node 140 or a same vehicle 105. In another example, the block 610 was visited twice, i.e., a blocked area 205 was identified, another field of view was identified in the block 615, and a second sensor 115 provided data from the other field of view in the block 630. In this example, the map could be based on data from at least two sensors 115, i.e., a first sensor 115 from a primary or original field of view, and second sensor 115 having a second field of view that at least partly resolves or provides data from a blocked area 205 with respect to the first sensor 115 having the primary field of view. Similarly, examples are possible in which the block 610 is visited three or more times, and the map is therefore generated based on data from sensors 115 having three or more fields of view. Further, examples are possible in which a same sensor 115m is used to observe two or more fields of view, e.g., a sensor 115m mounted to an arm 185 mounted to an infrastructure node 140 could be moved to provide a first set of sensor 115 data and a second set of sensor 115 data from first and second fields of view, the second point of view providing data from a blocked area 210 in the first field of view.

Alternatively, each sensor 115 providing a respective field of view could provide data to a respective computer 110 that could then generate an area map based on the sensed field of view of the respective sensor 115. The computer 110 (i.e., a "primary computer" 110) receiving data from the one or more sensors 115 sensing the primary field of view could then receive respective area maps from one or more other computers 110. The primary computer 110 could then concatenate or combine the respective area maps from the other computers 110 to generate a single area map.

Following the block 635, in the block 640, the computer 110 provides the map to one or more vehicles 105, e.g., via a communications module 130. The block 640 could be omitted if the computer 110 is a computer 110v, i.e., a computer 110v could omit to provide the map that it already has to itself. Alternatively, a computer 110v, like a computer 110n, could provide the map to one or more other vehicles 105.

Next, in a block 645, a vehicle 105 can operate based on the area map. For example, a vehicle computer 110v can plan a trajectory or path according to objects 210 indicated on the area map. The vehicle computer 110v could include data from the received area map on a map generated by the computer 110v. For example, a blocked area 205 with respect to the vehicle 105 could be described on the received area map. For example, the vehicle 105 planned path could account for one or more objects 210 in the blocked area 205. Alternatively or additionally, the vehicle computer 110v could plan a trajectory to avoid a blocked area 205 and/or to position the vehicle 105 so that it has one or more sensors 115 with a field of view including some or all of the blocked area 205. Thus, the computer 110v can provide instructions to actuators 120 of one or more components 125, e.g., to steer, break, or accelerate, based on the area map.

Following the block 635, the process 600 ends.

Conclusion

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Python, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
generating, in a computer, a map of an area from first sensor data of a first field of view of a first sensor including a blocked area, and second sensor data of a second field of view of a second sensor having an unblocked view of the blocked area in the first field of view, wherein the second field of view is determined based on at least one of a position of the second sensor, a position of an obstacle, and a size of the obstacle; and
providing the map to a vehicle for the vehicle to control vehicle operation based on the map.

2. The method of claim 1, further comprising moving the second sensor from a first position providing the first field of view to a second position providing the second field of view.

3. The method of claim 1, wherein the first sensor data and the second sensor data are respectively from a first sensor and second sensor.

4. The method of claim 3, wherein the first sensor is mounted to a stationary infrastructure node and the second sensor is included on a vehicle.

5. The method of claim 3, wherein the first sensor is mounted to a stationary infrastructure node and the second sensor is mounted to one of a movable platform attached to the infrastructure node or an unmanned aerial vehicle.

6. The method of claim 1, wherein identifying the blocked area includes determining a position and a size of the object.

7. The method of claim 1, further comprising generating the map based on third sensor data for a field of view of a second blocked area.

8. The method of claim 1, further comprising defining the blocked area based on lines of sight emanating from the first sensor.

9. A system, comprising a computer including a processor and a memory,
the memory storing instructions executable by the processor to:
generate a map of an area from first sensor data of a first field of view of a first sensor including a blocked area, and second sensor data of a second field of view of a second sensor having an unblocked view of the blocked area in the first field of view, wherein the second field of view is determined based on at least one of a position of the second sensor, a position of an obstacle, and a size of the obstacle; and
provide the map to a vehicle for the vehicle to control vehicle operation based on the map.

10. The system of claim 9, the instructions further comprising instructions to move the second sensor from a first position providing the first field of view to a second position providing the second field of view.

11. The system of claim 9, wherein the first sensor data and the second sensor data are respectively from a first sensor and second sensor.

12. The system of claim 11, wherein the first sensor is mounted to a stationary infrastructure node and the second sensor is included on a vehicle.

13. The system of claim 11, wherein the first sensor is mounted to a stationary infrastructure node and the second sensor is mounted to one of a movable platform attached to the infrastructure node or an unmanned aerial vehicle.

14. The system of claim 9, wherein identifying the blocked area includes determining a position and a size of the object.

15. The system of claim 9, the instructions further comprising instructions to generate the map based on third sensor data for a field of view of a second blocked area.

16. The system of claim 9, the instructions further comprising instructions to define the blocked area based on lines of sight emanating from the first sensor.

\* \* \* \* \*